United States Patent [19]
Akagi

[11] Patent Number: 5,858,570
[45] Date of Patent: Jan. 12, 1999

[54] COMMUNICATION APPARATUS, ELECTRONIC APPARATUS, AND BATTERY MANAGEMENT METHOD

[75] Inventor: Atsuhisa Akagi, Iwate, Japan

[73] Assignee: Sony Corporation, Tokyo, Japan

[21] Appl. No.: 670,749

[22] Filed: Jun. 21, 1996

[30] Foreign Application Priority Data

Jun. 27, 1995 [JP] Japan ................................. 7-183352

[51] Int. Cl.⁶ .................... H01M 10/44; H01M 10/48
[52] U.S. Cl. .................. 429/50; 429/92; 455/90
[58] Field of Search ................ 429/92, 90, 50; 455/90

[56] References Cited

U.S. PATENT DOCUMENTS

| | | | |
|---|---|---|---|
| 3,196,357 | 7/1965 | Hoag | 429/92 X |
| 4,910,103 | 3/1990 | Yoshikawa et al. | 429/92 X |
| 5,479,085 | 12/1995 | Honda et al. | 429/92 X |
| 5,543,245 | 8/1996 | Andrieu et al. | 429/90 |

*Primary Examiner*—Stephen Kalafut
*Attorney, Agent, or Firm*—Jay H. Maioli

[57] ABSTRACT

A communication apparatus which prevents problems caused by the increase of internal resistance in a battery. The apparatus obtains the internal resistance ($\Delta V$) of a battery, and if the internal resistance obtained is over a reference value, a message to change the battery is displayed to the user. The user exchanges the battery directed by the display, so that the problems due to the increase of the internal resistance can be prevented. Further, the battery voltage during transmission is predicted from the internal resistance, and if the predicted value is lower than a predetermined reference voltage, a message that no residual battery exists is displayed to the user, thereby avoiding the situation where the battery voltage becomes lower than the reference voltage because of the internal resistance at the moment of transmission, resulting in the apparatus being suddenly reset and the conversation cut off without any warning.

19 Claims, 6 Drawing Sheets

COMMUNICATION APPARATUS, ELECTRONIC APPARATUS, AND BATTERY MANAGEMENT METHOD

BACKGROUND OF THE INVENTION

1. Field of the Invention

This invention relates to a communication apparatus and, more particularly, is applicable to a digital cellular telephone apparatus.

2. Description of the Related Art

In a digital cellular telephone apparatus, an apparatus for communicating by a time division multiple access (TDMA) system in which a communication channel is multiplexed by dividing the same radio channels has been used. In such a digital cellular telephone apparatus, communication with a base station is performed by using a time-divided communication channel, and so transmission and reception must be performed alternately in time.

For instance, in the standard of digital cellular telephone apparatus in Japan, as shown in FIG. 1, one slot has been set to about 20 mS, and in that 6.7 mS is set as transmission (T), 6.7 mS is set as reception (R), 1 mS is set as a level measurement term (LM) of antenna city reception, and 5.7 mS is set as an idling term (I) for measurement of a receiving level from neighboring base stations.

In such a digital cellular telephone apparatus, a battery is used as a source of power. A consumption current of this battery varies in time because transmitting operation and receiving operation are performed alternately as described above. For instance, a consumption current about 1.2 A flows in transmission, and a consumption current about 0.3 A flows in reception.

Generally, voltage drop arises corresponding to a consumption current because a battery has internal resistance, as a result, a battery voltage output from the battery varies. For instance, in the case where a consumption current varies as described above, a battery voltage in transmission become smaller than that in reception.

Internal resistance of a battery tends to become higher by repeating charge and discharge. Thus in using of such a battery that has sequentially repeated charge and discharge, it is feared that a battery voltage becomes lower than a reset voltage at the moment of transmission started and the apparatus is reset because the internal resistance is extremely high; conversation is suddenly cut off.

To avoid this, heretofore, a method has been provided: a battery voltage in reception is measured to uniformly predict a battery voltage in transmission based on the measured value, and as a result, if thus predicted value is lower than a reset voltage, an alert is sounded to inform battery dead to a user and conversation is ended.

However, a power amplifier operating in transmission requires a large consumption current, and besides, one which fluctuates. In the method described above, there is a possibility that in some apparatuses even if a predictive value is higher than a reset voltage, a battery voltage become lower than a reset voltage owing to the fluctuation of a power amplifier on a practical transmitting operation; suddenly the apparatus is reset and conversation is cut off without sounding an alert. Further, in the above method, if the internal resistance increases by repeated charges and discharges of a battery, the above problem will arise.

SUMMARY OF THE INVENTION

In view of the foregoing, an object of this invention is to provide a communication apparatus, an electronic apparatus and a battery management method which can prevent bad influence owing to increasing of internal resistance in a battery.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
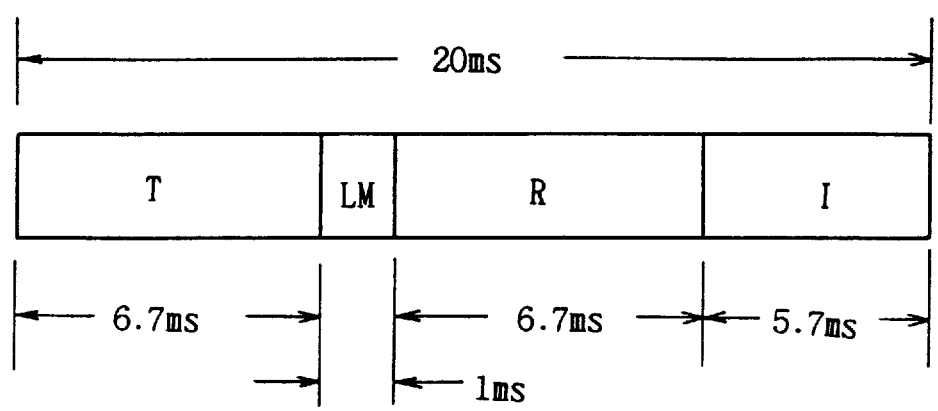
FIG. 1 is a schematic diagram showing a structural example of a slot in a time-division multiple system.
Figure 2:
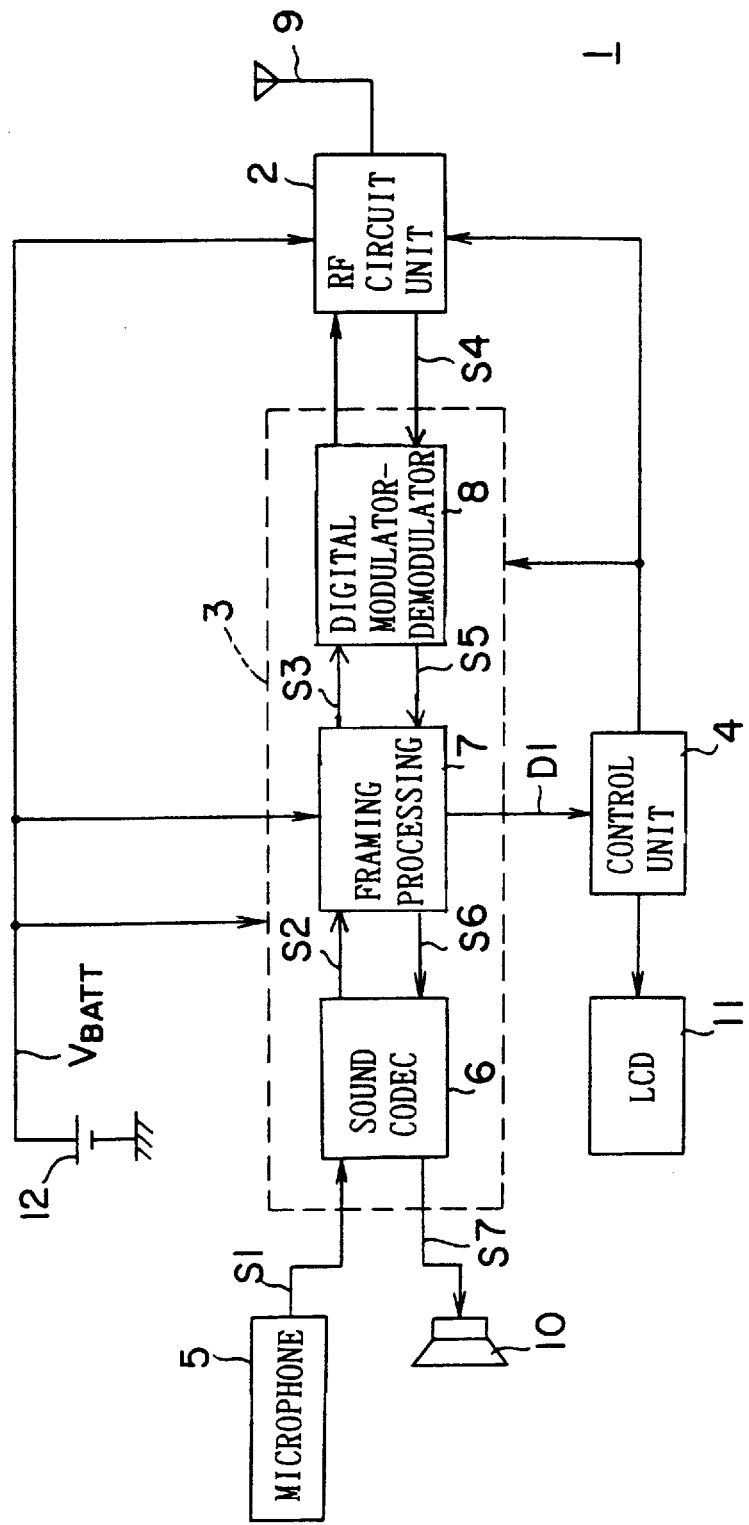
FIG. 2 is a block diagram showing the construction of a digital cellular telephone apparatus according to an embodiment of the present invention.

Preferred embodiments of this invention will be described with reference to the accompanying drawings:

In FIG. 2, reference numeral 1 generally shows a digital cellular telephone apparatus according to an embodiment of the present invention, the apparatus communicates with a base station by a TDMA system. This digital cellular telephone apparatus 1 is formed by a radio frequency (RF) circuit unit 2, a baseband circuit unit 3, a control unit 4 and so on.

A sound signal S1 taken in by a microphone 5 is first input to a sound codec circuit 6 in the baseband circuit unit 3 to be digital-converted and high-efficiently coded; it is converted to a digital sound data S2. This digital sound data S2 is input to a framing processing circuit 7 to be converted to a transmission data S3 conforming to the format of the TDMA system. The transmission data S3 is input to a digital modulator-demodulator circuit 8 to be subjected to digital modulation, for example, π/4 shift quadrature phase shift keying (QPSK) modulation or the like, and then it is subjected to frequency conversion, power amplification and so on, thus obtained data is propagated in space via an antenna 9.

On the other hand, a signal transmitted from a base station is received by the antenna 9 and supplied to the RF circuit unit 2. The RF circuit unit 2 subjects power amplification, frequency conversion and so on to the received signal and supplies thus obtained received signal S4 to the digital modulator-demodulator circuit 8. The digital modulator-demodulator circuit 8 demodulates the received signal S4, for instance, which has been subjected to digital modulation such as the π/4 shift QPSK modulation, to obtain a received data S5. This received data S5 is input to the framing processing circuit 7 to be extracted a digital sound data S6 included in the received data S5. The extracted digital sound data S6 is input to the sound codec circuit 6 to be decoded and digital-to-analog-converted; it is converted to an original sound signal S7. In this way, a sound corresponding to the sound signal S7 is output from a speaker 10.

The control unit 4 controls the operation of the whole apparatus, including the RF circuit unit 2, baseband circuit unit 3, et al. For instance, in respect to the baseband circuit unit 3, the control unit 4 performs control of timing processing when the transmission data S3 of the TDMA system is formed, and communicating operation, such as call, cutting off, and position registration. On the other hand, in respect to the RF circuit unit 2, the control circuit unit 4 performs on/off control of a power amplifier used for power amplification, and control of an oscillation frequency of a local oscillator used in frequency conversion. Besides, the control circuit unit 4 displays various information, such as receiving sensitivity, a state of battery, and dial information input from ten keys (not shown) on a liquid crystal display (LCD) 11.

By the way, in the digital cellular telephone apparatus 1 having such a circuit structure, a battery 12, for example, being a lithium ion battery, is provided to supply a battery voltage $V_{BATT}$ output from the battery 12 to each circuit, the RF circuit unit 2, baseband circuit unit 3 and so on. That is, each circuit operates using the battery voltage $V_{BATT}$ as driving power.

Figure 3:
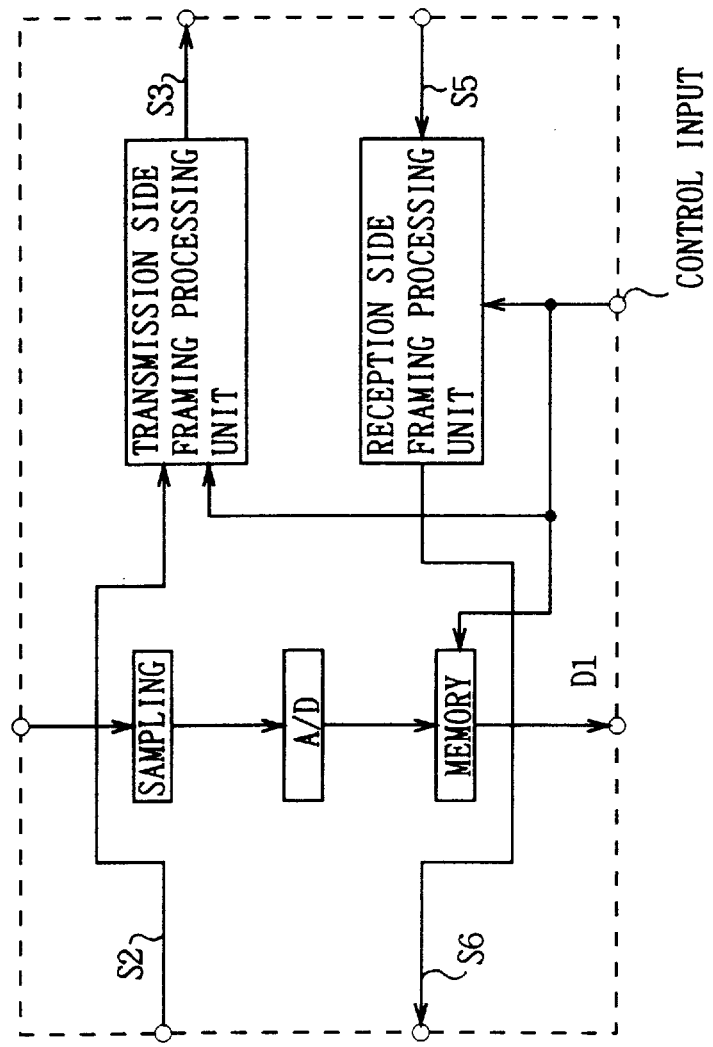
FIG. 3 is a block diagram showing the framing processing unit.

Further the battery voltage $V_{BATT}$ is taken into the framing processing circuit 7 to monitor a battery condition. As shown in FIG. 3, the sampling unit in the framing processing circuit 7 samples the battery voltage $V_{BATT}$ at a predetermined timing and analog-to-digital-converts the sampled data to obtain a battery voltage data, then stores the battery voltage data into an internal memory. This battery voltage data D1 is read out by the control unit 4. The control unit 4 checks a battery condition based on the battery voltage data D1, as a result, if the battery 12 has no residuals, for instance, the control unit 4 sounds an alert from the speaker 10. As referring to FIG. 3, the signal D1 is obtained from the memory to check it. Then the control unit 4 gives the reception side frame processing unit the order so as to output the alarm in the signal S6. Further, the control unit 4 displays that the battery 12 has no residuals (an empty state of the battery); on the liquid crystal display 11. Thereby, a user can inform that the battery 12 has no residuals and can charge (or exchange) the battery rapidly.

Furthermore, if it is detected that an internal resistance of the battery 12 is larger than a fixed reference value, the control unit 4 displays on the liquid crystal display 11 that the battery 12 should be exchanged (replaced). Thereby, the user can be informed that the battery 12 is dead and can exchange the battery rapidly.

Hereinafter, the aforementioned management method of a battery condition will be described.

Figure 4:
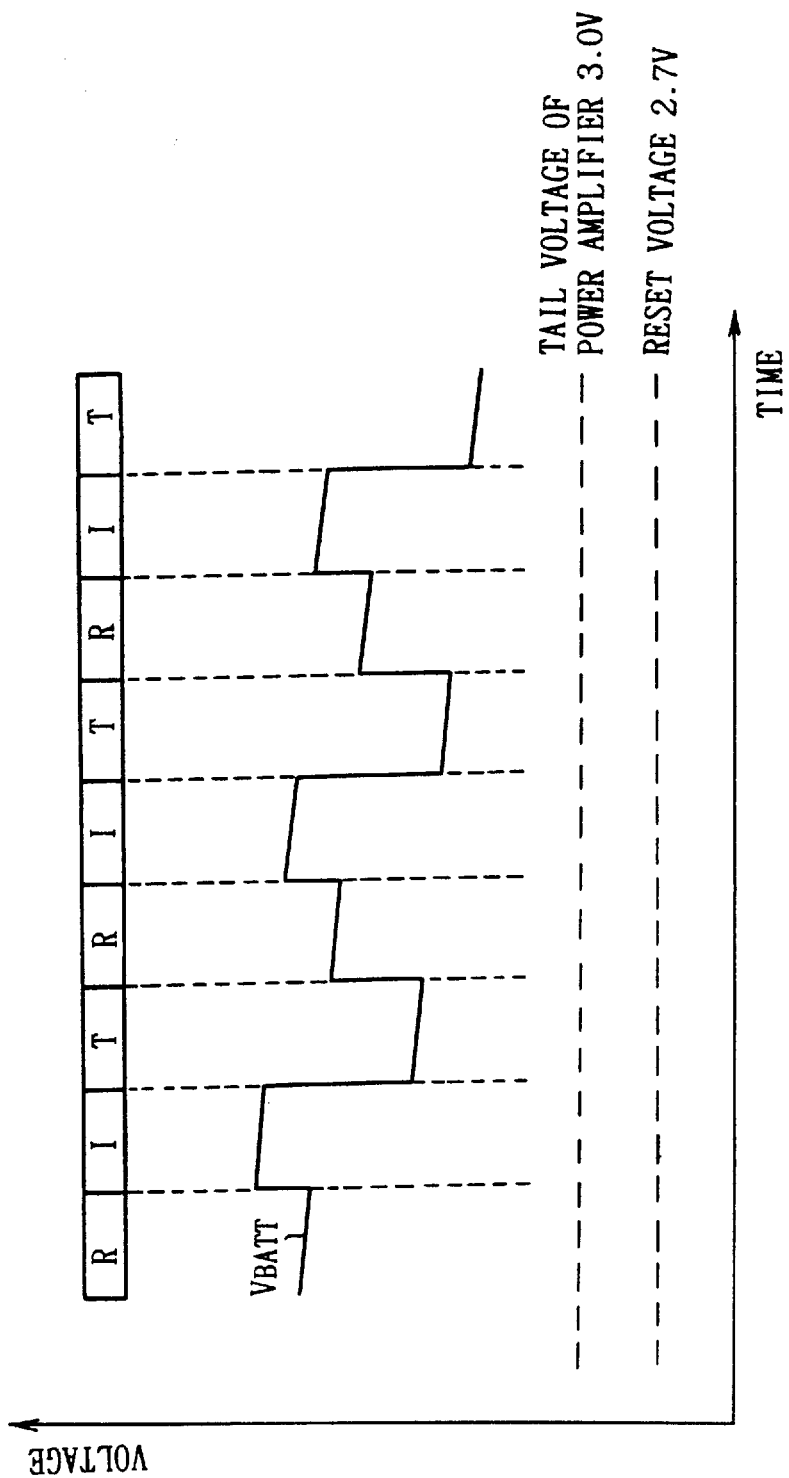
FIG. 4 is a schematic diagram explaining variation of battery voltage in the case where internal resistance is low.

It will be first described the variation of the battery voltage $V_{BATT}$ when the digital cellular telephone apparatus 1 is in a communicating operation. FIG. 4 shows variations of the battery voltage $V_{BATT}$ in the state where a battery is new and the internal resistance is low. When a state shifts from a reception state (R) to an idling state (I) being a non-transmission and reception state, as shown in FIG. 4, a battery voltage $V_{BATT}$ increases because of a reduced consumption current. Then when a state shifts from the idling state (I) to a transmission state (T), a voltage drop arises across the internal resistance owing to increasing of a consumption current leading to a reduction of the battery voltage $V_{BATT}$. For instance, assuming that an internal resistance of the battery is 0.3 ohms and a consumption current in transmission is 1.2 A, the voltage drop becomes about 0.36 V. The battery voltage $V_{BATT}$ gradually reduces while repeating increasing and reducing in accordance with a shift in a state of the digital cellular telephone apparatus 1.

Figure 5:
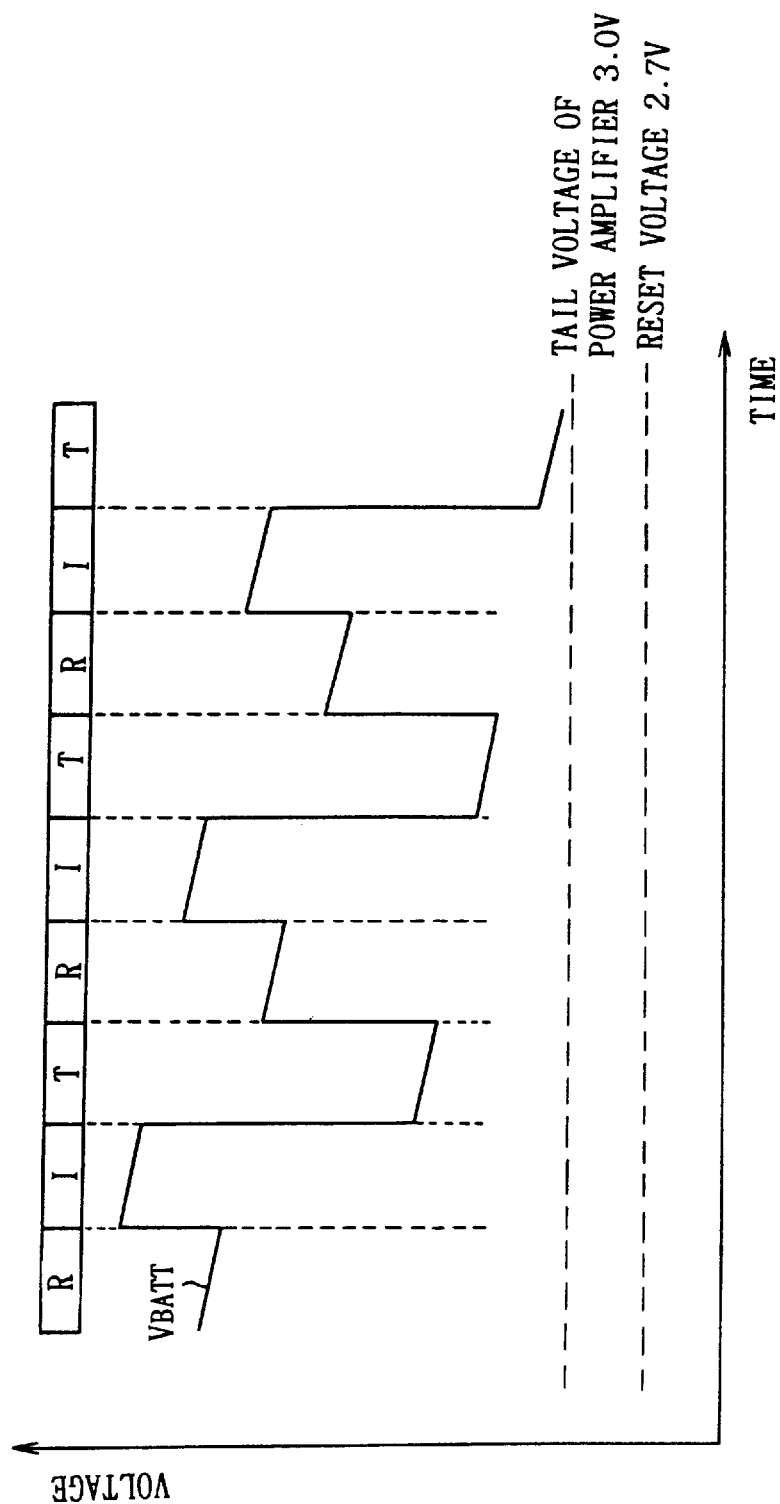
FIG. 5 is a schematic diagram explaining variation of battery voltage in the case where internal resistance increases.

On the other hand, if an internal resistance increases because of repeated charges and discharges, variations of the battery voltage $V_{BATT}$ become as shown in FIG. 5: extremely large voltage drop arises in shifting from an idling state to a transmission state. For instance, assuming that an internal resistance increases to 0.5 ohms, voltage drop reaches about 0.6 [V]. As a result, even if the battery voltage $V_{BATT}$ in an idling state is about 3.2 V, the battery voltage $V_{BATT}$ is reduced to about 2.6 V at the moment of shifting to a transmission state and lowers a reset voltage; and the apparatus is suddenly reset.

Figure 6:
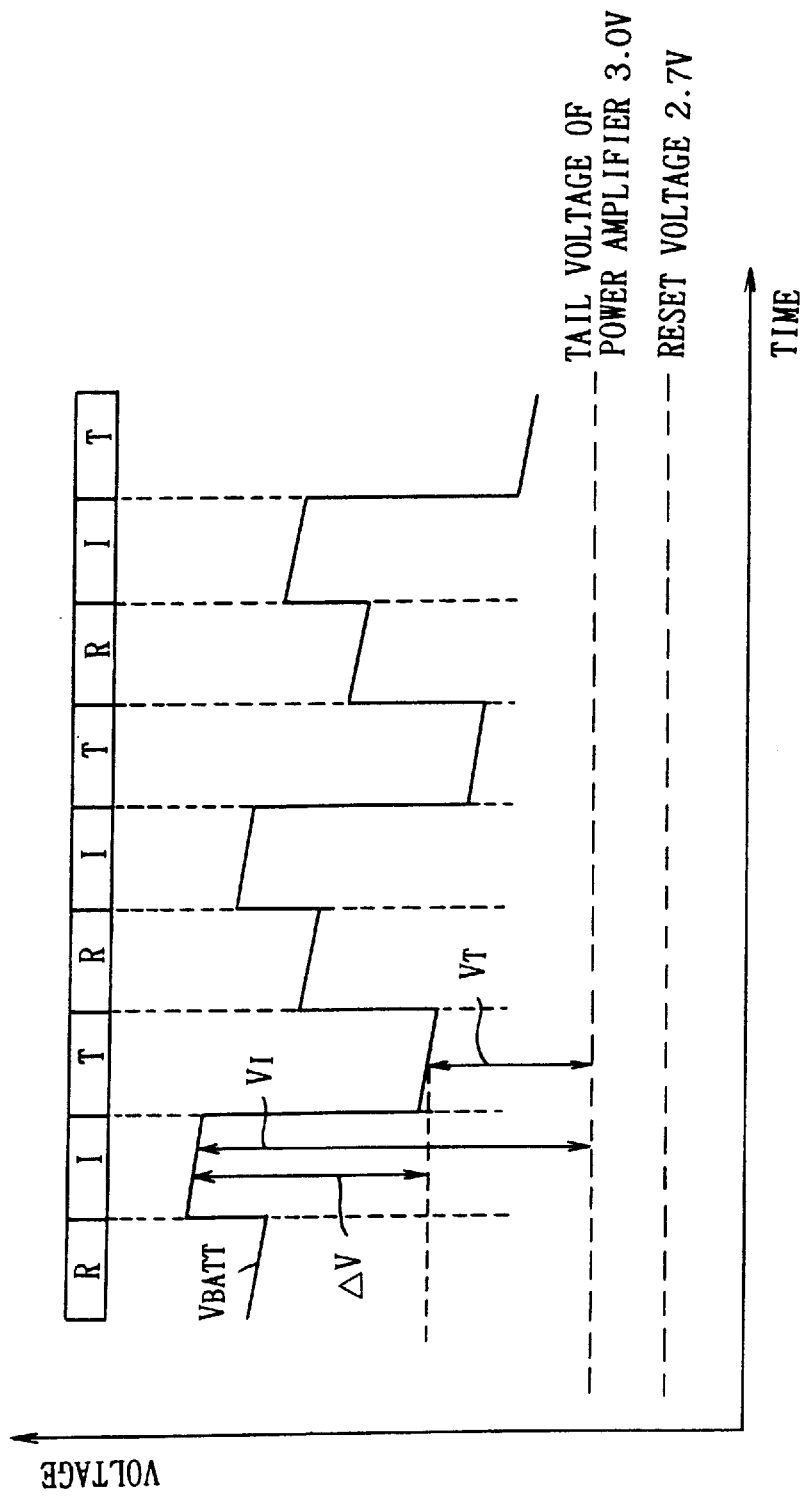
FIG. 6 is a schematic diagram explaining a monitoring method of battery voltage.

Then, in the case of this embodiment, as shown in FIG. 6, a battery voltage data $V_I$ in an idling state is first taken into the framing processing circuit 7, and then a battery voltage data $V_T$ in a transmission state is taken in.

Thereafter, the control circuit 4 obtains a difference voltage $\Delta V (=V_I - V_T)$ between the battery voltage data $V_I$ and $V_T$ taken in based on those. This difference voltage $\Delta V$ is a voltage proportional to an internal resistance of the battery 12 and shows a relative magnitude of the internal resistance.

In the digital cellular telephone apparatus 1 of this embodiment, such difference voltage $\Delta V$ is obtained in position registration for instance, and if the difference voltage $\Delta V$ is larger than a fixed reference value (for example, about 0.5 V, information showing that the battery should be exchanged is displayed on the liquid crystal display 11. Note that, the information is released when the difference voltage $\Delta V$ becomes smaller than a reference value by battery exchange. Besides, if the battery voltage data $V_T$ in a transmission state is lower than a tail voltage of the power amplifier, an alert showing no residual battery is output and also the information showing no residual battery is displayed on the liquid crystal display 11.

Further, the digital cellular telephone apparatus 1 of this embodiment takes in the battery voltage data $V_I$ in an idling state in conversation, and subtracts the difference voltage $\Delta V$ which has been obtained previously from the battery voltage data $V_I$ to predict a battery voltage $V_{BATT}$ in a transmission state. As a result, if thus predicted battery voltage $V_{BATT}$ is lower than a tail voltage of the power amplifier, the digital cellular telephone apparatus 1 outputs an alert sound showing no residual battery capacity and displays the information on the liquid crystal display 11. If thus predicted battery voltage $V_{BATT}$ is also lower than a reset voltage, the digital cellular telephone apparatus 1 automatically ends conversation. Correct prediction can be implemented by predicting a battery voltage $V_{BATT}$ in a transmission state based on the difference voltage $\Delta V$ as the above. Because in the case where a battery voltage in a transmission state is predicted based on a battery voltage in a reception state as a prior art, correct prediction is impossible due to the fluctuation of a consumption current of the power amplifier, however, by battery voltages in an idling state and a transmission state ($V_I$ and $V_T$) are obtained to predict based on a difference voltage $\Delta V$ of those as this embodiment, correct prediction can be implemented by avoiding influence owing to the fluctuation of a consumption current of the power amplifier.

In this connection, such a prediction of a battery voltage $V_{BATT}$ in a transmission state is performed per five slots for instance.

On the above structure, the digital cellular telephone apparatus 1 of this embodiment takes in the battery voltage data $V_I$ in an idling state and battery voltage data $V_T$ in a transmission state, for instance, in position registration, and obtains a difference voltage $\Delta V$ $(=V_I-V_T)$ showing an internal resistance of the battery 12 based on the battery voltage data $V_I$ and $V_T$ thus taken in, then if the difference voltage $\Delta V$ is larger than a fixed reference value, displays on the liquid crystal display 11 information showing that the battery should be exchanged. Therefore, if the user performs battery exchange, negative effects due to increasing of internal resistance can be prevented.

Besides, in the case of this embodiment, the digital cellular telephone apparatus 1 takes in the battery voltage data $V_I$ in an idling state, and subtracts the previously obtained difference voltage $\Delta V$ from thus taken battery voltage data $V_I$ to predict a battery voltage $V_{BATT}$ in a transmission state. As a result, if the predicted value is lower than a tail voltage of the power amplifier, the digital cellular telephone apparatus 1 sounds an alert showing no residual battery and displays the information on the liquid crystal display 11. If it is also lower than a reset voltage, the digital cellular telephone apparatus 1 ends conversation. A battery voltage $V_{BATT}$ in a transmission state is predicted based on a difference voltage $\Delta V$ as the above, so that correct prediction can be implemented by avoiding the fluctuation of a consumption current of the power amplifier. Thereby, it can be avoided that a battery voltage $V_{BATT}$ becomes lower than a reset voltage at the moment of transmission started and conversation is cut off without sounding an alert as a prior art.

According to the above structure, a difference voltage $\Delta V$ showing internal resistance is obtained to predict a battery voltage $V_{BATT}$ in a transmission state based on the obtained difference value $\Delta V$. As a result, if the predicted value is lower than a reference voltage, it is informed to a user that no residual battery exists, and if the difference voltage $\Delta V$ is over a reference value, it is informed to the user that the battery should be exchanged. Thereby, a digital cellular telephone apparatus capable of preventing negative effects due to increasing of internal resistance in a battery, can be accomplished.

In the aforementioned embodiment, it has been described in the case where if a difference voltage $\Delta V$ is simply over a reference value, it is informed that the battery should be exchanged, however, the present invention is not limited to such a case, but for instance, may obtain a difference voltage $\Delta V$ plural times, and when a mean value of those is over a reference value, may inform that, further, when over a reference value plural times successively, may inform that. Thereby, a time for battery exchange can be detected more precisely.

Further, in the aforementioned embodiments, it has been described in the case where internal resistance is shown by a difference voltage $\Delta V$, however, the present invention is not limited to such a case, but an internal resistance value is practically obtained by dividing a difference voltage $\Delta V$ by a current value to compare the internal resistance value with a reference value, so as to obtain the same effects as the above. Note that, needless to say, it is convenient that internal resistance is shown by a difference voltage $\Delta V$ to predicting a battery voltage $V_{BATT}$ in a transmission state.

Moreover, when the battery voltage data $V_I$ in an idling state and the battery voltage data $V_T$ in a transmission state are taken in, an actual voltage can be taken in, or a difference voltage between the actual voltage and a tail voltage of a power amplifier can be taken in.

Furthermore, in the aforementioned embodiments, it has been described in the case where the battery voltage data $V_I$ in an idling state and the battery voltage data $V_T$ in a transmission state are taken in one slot, i.e., time period to obtain a difference voltage $\Delta V$, however, the present invention is not limited to this, but respective processing can be performed in a different slot such that, for instance, the battery voltage data $V_I$ in an idling state is taken in a first slot, the battery voltage data $V_T$ in a transmission state is taken in a third slot, and a difference voltage $\Delta V$ is obtained in a fifth slot. Thereby, a burden of the control circuit 4 can be reduced.

Further, in the aforementioned embodiments, it has been described in the case where prediction of a battery voltage $V_{BATT}$ in a transmission state is performed per five slots, however, the present invention is not limited to this, but can be performed every time if processing ability of the control circuit 4 permits, the percentage is not limited.

Furthermore, in the aforementioned embodiments, it has been described in the case where the present invention is applied to the digital cellular telephone apparatus 1, however, the present invention is not limited to this, but is widely applicable to communication terminal equipment, driven by a battery and communicating by a time-division multiplex system.

As described above, according to the present invention, a battery management means is provided, in which internal resistance of a battery is obtained to predict battery voltage in transmission based on thus obtained internal resistance, as a result, if the predicted value is lower than a reference voltage, it is informed to a user that no residual battery exists, and also if the internal resistance is over a reference value, it is informed to a user that the battery should be exchanged. Thereby, a communication apparatus capable of preventing bad influence due to increasing of internal resistance in a battery can be realized;

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A battery operated electronic apparatus comprising:

a battery;

measuring means for detecting voltage values of said battery; and informing means for informing a user of the apparatus by first information when said measuring means detects a first voltage value and by second information when said battery condition measuring means detects a second voltage value wherein said measuring means detects said voltage values between a pair of terminals of said battery, detects a current from said battery, and calculates an internal resistance of said battery.

2. A battery operated communication apparatus for radio communication comprising:

transmitting means for transmitting information;

receiving means for receiving information;

a battery;

measuring means for detecting voltage values of said battery;

state predicting means for predicting a state of said battery when said transmitting means is in a transmitting mode based on a detected voltage value of said battery when said transmitting means is in an idle mode; and informing means for informing a user of the apparatus by first information when said measuring means detects a first voltage value and by second information when said measuring means detects a second voltage value.

3. The communication apparatus as claimed in claimed 2, wherein said measuring means detects said voltage values between a pair of terminals of said battery.

4. The communication apparatus as claimed in claim 2, wherein said measuring means detects said voltage values of said battery when said transmitting means and said receiving means are operating and when said transmitting means and said receiving means are idling.

5. The communication apparatus as claimed in claim 2, wherein said first information is information to replace said battery, and said second information is information of a discharge state of said battery.

6. The communication apparatus as claimed in claim 5, wherein said informing means informs said first and/or said second information using a sound and/or display.

7. The communication apparatus as claimed in claim 4, wherein said transmitting means and said receiving means are transmitting and receiving using a time division multiple access signal respectively.

8. The communication apparatus as claimed in claim 2, wherein said transmitting means and said receiving means are transmitting and receiving using a time division multiple access signal, respectively.

9. The communication apparatus as claimed in claim 7, wherein said measuring means detects one of said voltage values of said battery once in "n" slots of a time division multiple access slot.

10. The communication apparatus as claimed in claim 8, wherein said measuring means detects one of said voltage values of said battery once in "n" slots of a time division multiple access slot.

11. The communication apparatus as claimed in claim 7, wherein said measuring means detects said voltage values of said battery a plurality of times, and calculates a mean value of said voltage values detected in said plurality of times.

12. The communication apparatus as claimed in claim 8, wherein said measuring means detects said voltage values of said battery a plurality of times, and calculates a mean value of said voltage values detected in said plurality of times.

13. The communication apparatus as claimed in claim 7, wherein said measuring means detects said voltage values of said battery a plurality of times.

14. The communication apparatus in claim 8, wherein said measuring means detects said voltage values of said battery a plurality of times.

15. The communication apparatus as claimed in claim 7, wherein said measuring means detects said voltage values of said battery when transmitting and when idling at different time division multiple access slots, respectively.

16. A battery management method for a battery operated communication apparatus comprising steps of:

transmitting information;

receiving information;

measuring voltage values of a battery;

predicting a state of said battery when said communication apparatus is in a transmitting mode based on a measured result in said measuring step of said battery communication apparatus is in an idling mode; and informing a user of the apparatus by first information when a first voltage value is detected at said measuring step and informing by second information when a second voltage value detected at said measuring step.

17. The battery management method as claimed in claim 16, wherein said measuring step detects voltage values of said battery when performing said transmitting step of the apparatus and when performing a step of idling the apparatus.

18. The battery management method as claimed in claim 16, wherein said first information is information "to replace said battery", and said second information is information of "a discharge state of said battery".

19. The battery management method as claimed in claim 16, wherein said informing step informs said first and/or said second information using a sound and/or a display.

* * * * *